April 1, 1947. C. S. ROBISON 2,418,427
MEANS FOR AND METHOD OF MAKING SALT
Filed Oct. 12, 1942 2 Sheets-Sheet 1
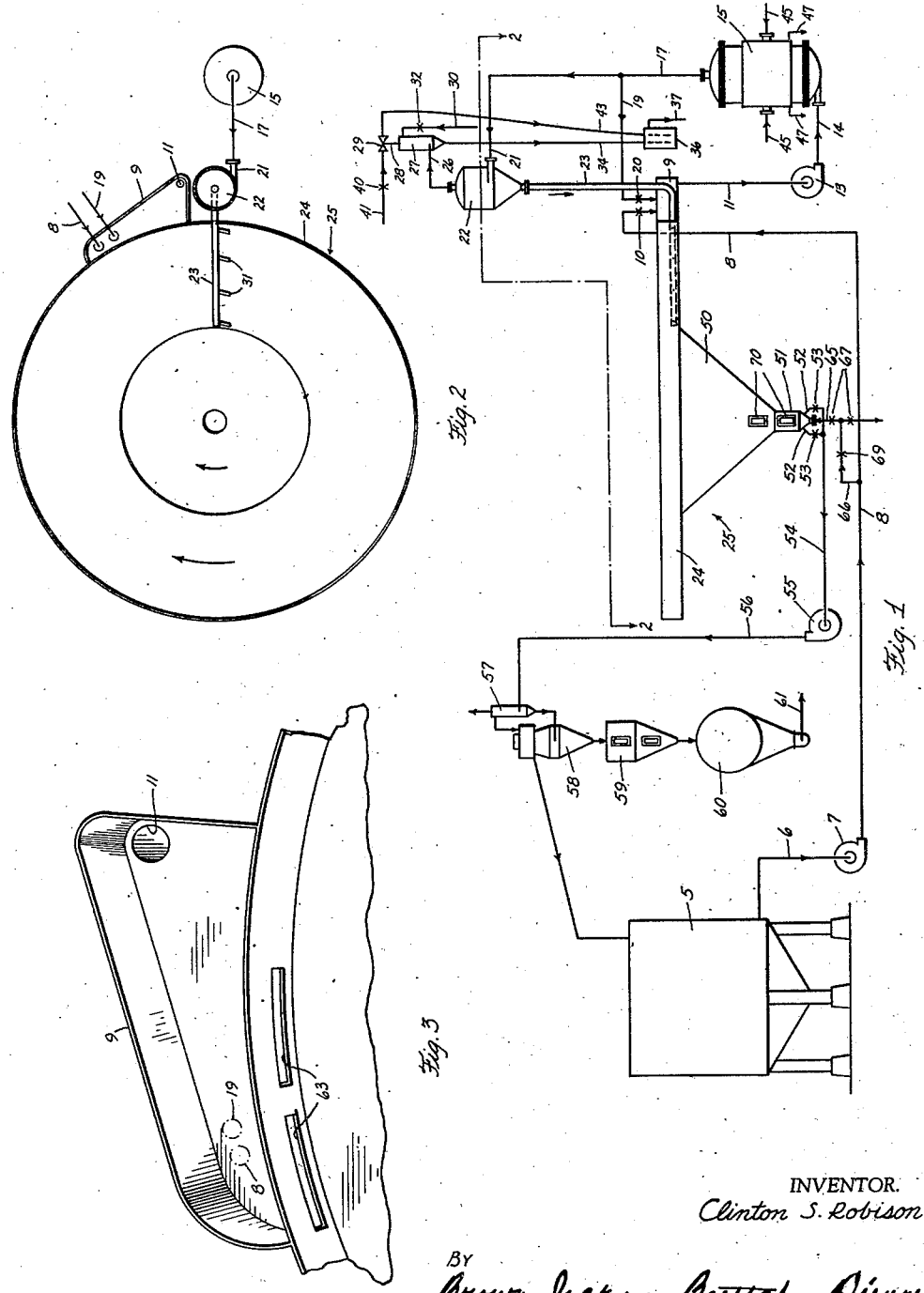
INVENTOR.
Clinton S. Robison
BY
Brown, Jackson, Boettcher & Dienner
ATTORNEYS April 1, 1947.  C. S. ROBISON  2,418,427
MEANS FOR AND METHOD OF MAKING SALT
Filed Oct. 12, 1942  2 Sheets-Sheet 2

INVENTOR.
Clinton S. Robison

BY
Brown, Jackson, Boettcher & Dienner
ATTORNEYS

Patented Apr. 1, 1947

2,418,427

UNITED STATES PATENT OFFICE 2,418,427

MEANS FOR AND METHOD OF MAKING SALT

Clinton S. Robison, Chicago, Ill.

Application October 12, 1942, Serial No. 461,682

4 Claims. (Cl. 23—303)

The present invention relates to an improvement in apparatus and method for making salt.

The present invention relates to an improvement in apparatus and method of making salt wherein the salt is obtained by introducing super-saturated brine into substantially saturated brine, in which the seed lattice present in the super-saturated brine expedites and facilitates separating out of the salt crystal aggregates from the saturated brine by surface evaporation thereof.

In the earlier forms of apparatus and the methods heretofore practiced the brine was introduced into the grainer in either saturated or unsaturated condition, and consequently the rate of formation of salt crystal aggregates was not of sufficient rapidity for efficient production at low operating temperatures and corresponding thermal efficiency.

It is an object of my invention to provide an improved form of apparatus and method by which a super-saturated brine is adapted to be delivered to a grainer at low temperatures to enable increased production of salt with increased thermal efficiency. More specifically I provide a flasher for removing water from the brine solution, a condenser connected to the flasher, and an ejector, preferably a steam ejector, connected to the condenser and through the latter to the flasher to provide a partial vacuum in the condenser and flasher so that brine introduced into the flasher has sufficient water removed therefrom to produce a super-saturated solution, the removed water being condensed by the condenser. A more specific feature of my invention resides in utilizing the ejector means for carrying away the non-condensibles from the condenser present in the water removed from the brine by the flasher. A still further object of my invention resides in providing a jet extending from the outlet of the flasher to the pan of a stationary grainer to impart rotary movement to the solution delivered to the grainer to facilitate separation of salt crystal aggregates from the super-saturated brine. Still more specifically the jets for the delivery of super-saturated brine to the grainer are directed circumferentially of the pan of the latter which in the preferred form of my invention comprises a substantially cylindrical top portion. Also, in the preferred form of my invention a receptacle or suction well is disposed adjacent the shallow top portion of the grainer for receiving a portion of the brine from which the salt crystal aggregates have been removed, saturated brine from the brine supply, and a portion of brine by-passed from a heat exchanger for enabling feeding of unsaturated preheated brine to the heat exchanger to prevent salting up of brine in the various conduits and pumps of the system, enabling continuous operation thereof. It will appear from the following detail description that the apparatus and method of my invention provide for maintaining the brine solution of various stages in either unsaturated or substantially saturated condition thereby preventing clogging of the various conduits forming a part of the apparatus but utilizing the advantages to be obtained from introducing a super-saturated solution into the grainer for enabling rapid separation of salt crystal aggregates from the brine.

Other objects and advantages of my invention will appear from the detail description.

Now, in order to acquaint those skilled in the art with the manner of constructing an apparatus and utilizing the method of my invention, I shall describe in conjunction with the accompanying drawings a preferred embodiment of the same.

In the drawings:

Figure 1 is a flow diagram of the process and apparatus embodying the principles of the present invention;

Figure 2 is a view taken substantially on the line 2—2 of Figure 1 looking in the direction indicated by the arrows;

Figure 3 is a perspective view of a portion of the grainer pan and suction well shown in Figure 1.

Figure 4:
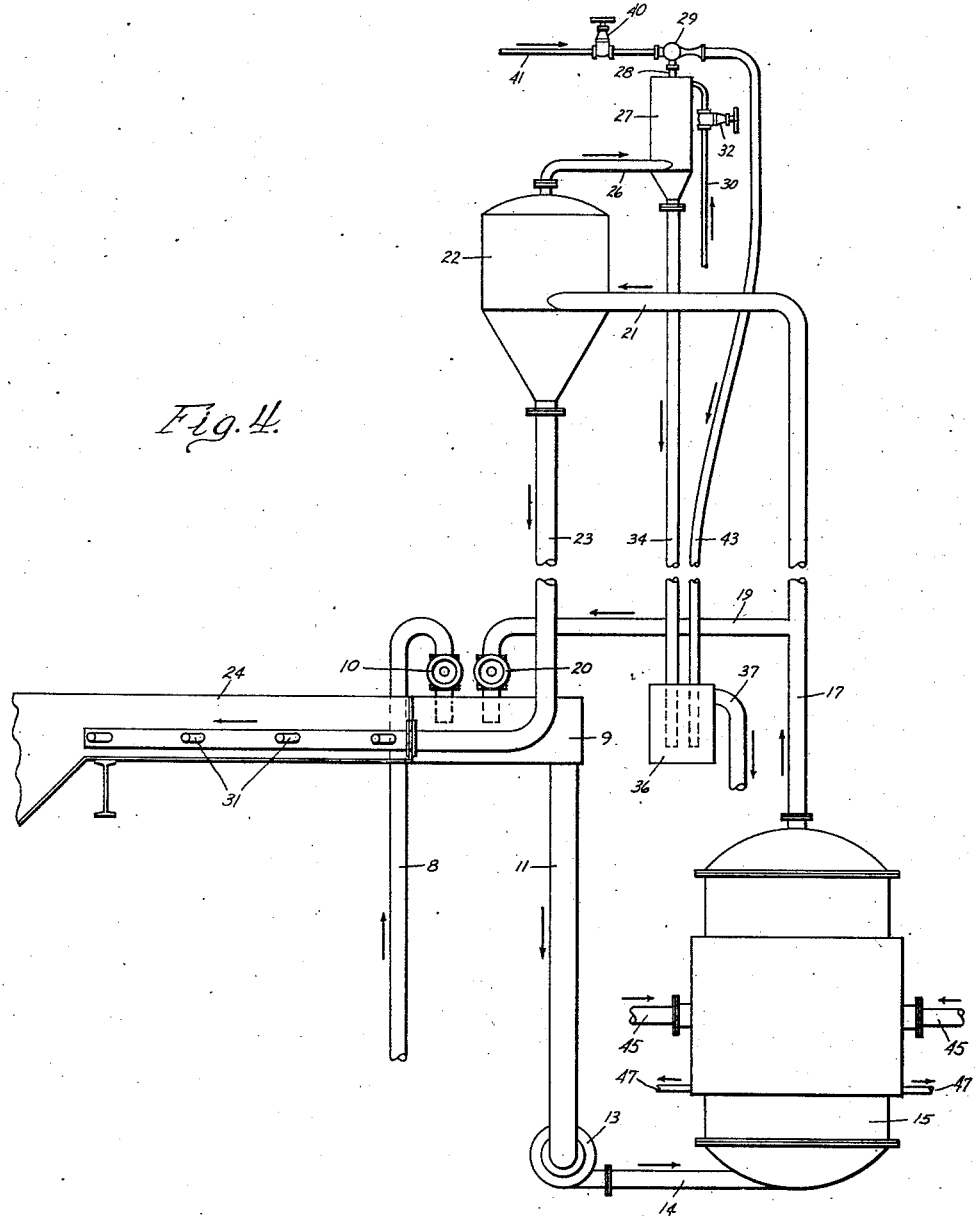
Figure 4 is an enlarged side elevational view of the right hand portion of the flow diagram of Figure 1 and showing more particularly the improvements of the present invention over known form of apparatus and methods of recovering or producing salt.

Referring now to the drawings, it will be seen that the present invention has been incorporated in an apparatus comprising a brine supply storage tank 5 from which a conduit 6 extends to a suitable pump 7. A conduit 8 extends from the pump 7 and discharges into a receptacle or suction well 9. A valve 10 is interposed in the conduit 8 adjacent the outlet thereof for regulating the flow of feed brine from the storage tank to the suction well 9. A conduit 11 extends from the base of the suction well 9 to a pump 13 which discharges through a conduit 14 into a heat exchanger 15 of known construction. This heat exchanger may be of the construction disclosed more in detail in my prior Patent No. 2,279,061, issued April 7, 1942. A conduit 17 extends from the outlet of the heat exchanger 15 and a branch conduit 19 leads from the conduit 17 to the suction well or receptacle 9. A valve 20 is interposed in the conduit 19 adjacent the outlet thereof and is adapted to be manually operated to regulate the flow of a portion of brine from the heat exchanger 15 to the well 9. The conduit 17 leads directly to an inlet 21 of a flasher 22 of known construction and a conduit 23 extends from the outlet of the bottom of the inverted frusto-conical portion of the flasher 22. The conduit 23 is provided adjacent its outlet with a plurality of nozzles 31 directed circumferentially of a top cylindrical shallow pan portion 24 of a stationary grainer 25. A conduit 26 extends from the upper end of the flasher 22 to a condenser 27 which in turn is connected through a conduit 28 to a steam ejector 29. Referring now to Figure 4 it will be seen that a cooling water inlet conduit 30 in which a manually operable valve 32 is interposed extends into the upper portion of the condenser 27 and an outlet 34 extends from the lower end of the condenser to a seal tank 36 from which extends an overflow pipe 37 leading to a sewer. A manually operable valve 40 is interposed in a steam inlet conduit 41 for regulating admission of steam to the ejector 29. An outlet conduit 43 extends from the ejector 29 to the seal tank 36. The heat exchanger 15 may be connected to the source of supply providing steam for the ejector 29 associated with the condenser, or other suitable source of steam supply, and it will be seen that inlets 45 provide for admission of steam to the heat exchanger and outlets 47 provide for conducting the exhausted steam away from the heat exchanger 15, the heat of the steam introduced into the heat exchanger being utilized to heat the brine introduced into it through the conduit 14.

The grainer 25 except for the provision of the suction well 9 is of known form and comprises an inverted frusto-conical portion 50 having a leg portion 51 which may be constructed in accordance with the teachings of my aforementioned patent. From the leg 51 of the grainer a pair of conduits 52 having valves 53 interposed therein communicate with a conduit 54 leading to a pump 55 from which extends a conduit 56 to an air separator 57 which communicates with a suitable washer 58 of known construction discharging into a feed tank 59 having communication with a filter 60 delivering the finished salt product to an endless belt conveyor 61 or other suitable apparatus for conducting the finished salt away from the apparatus. The arrangement and construction of the air separator 57, washer 58, feed tank 59, filter 60 and conveyor 61 are conventional and need not be further described for an understanding of my present invention.

In the preferred operation of the apparatus salt brine from the storage tank 5 is conducted through the conduit 8 from the feed pump 7 at substantially 70° F., there being 2647 pounds NaCl per thousand gallons and at this temperature is substantially saturated. The brine is withdrawn from the suction well 9 by means of the pump 13 and when it is introduced into the heat exchanger 15 through the conduit 14, the brine is brought to a temperature of approximately 230° F. having a maximum solubility of 2815 pounds NaCl per thousand gallons and is unsaturated. As before described, a portion of the brine from the heat exchanger 15 is by-passed back to the well 9 whereat it is mixed with the brine being supplied by the pump 7 to the well to preheat the brine at this point. The remaining portion of the brine from the heat exchanger is introduced into the flasher 22 through the conduit 17 whereat the flashing operation is conducted under partial vacuum so that the solution discharged through the conduit 23 from the flasher is maintained at a temperature of approximately 206° F. there being 2740 pounds NaCl per thousand gallons and this constitutes a super-saturated brine. During the flashing operation the condenser 27 functions to condense the water removed from the brine in the flasher 22, and the non-condensible particles contained in this water are removed by the steam ejector 29 and are conducted therefrom through conduit 43 into the seal tank 36 whence they are discharged to the sewer through the conduit 37. The super-saturated brine passing through conduit 23 is introduced circumferentially into the cylindrical top portion or pan 24 of the grainer 25 through the nozzles 31 supported in the end portion of conduit 23. By discharging the super-saturated brine in this manner a rotary movement is imparted to it and since the solution is super-saturated it contains seed lattice which readily causes the formation of salt crystal aggregates by surface evaporation of the saturated brine in the grainer, which move inwardly due to centripetal force developed in the rotating brine into the frusto-conical inverted portion 50 whence they pass into the leg 51. Part of the brine from which the salt crystal aggregates have been removed by reason of the vertical head and forces opposing centripetal movement of liquid will pass through slots 63 formed in the annular vertical wall defining the pan 24 to the suction well 9. This brine is mixed with the brine being supplied from the storage supply chamber 5 and the portion of the brine solution by-passing the flasher to again be reintroduced through the conduit 11 by action of the suction pump 13 into the heat exchanger and the cycle of operation is again repeated. It will be understood that the temperatures and concentrations of the brine in the several parts of the apparatus are only illustrative of one set of conditions suitable in practicing the invention.

It will be observed that the solution in the conduits 11 and 14 is under-saturated so that there is no danger of precipitation of salt crystal aggregates in these conduits. Further, it will be seen that the solution being discharged from the flasher 22 is super-saturated so that upon discharge of the solution into the grainer pan 24 the formation of salt crystal aggregates is greatly enhanced.

Referring now more in detail to the discharge leg 51 of the grainer it will be seen that a conduit 65 extends from the bottom thereof, and a conduit 66 is connected between conduits 8 and 65, a pair of valves 67 are interposed in conduit 65 one on each side of its junction with conduit 66. Also a valve 69 is provided in conduit 66. Valves 67 and 69 are operable for admitting brine from the storage supply 5 to leg 51 for laundering the salt crystal aggregates, the resulting slurry being conducted to the air separator 57 and ancillary equipment by means of conduits 52, valves 53, and conduit 54 as previously described. The laundering operation is observable through a pair of windows 70 one of which is disposed at the lower end of the frusto-conical inverted portion and the other in the leg 51 proper. Opening of both valves 67 and closing of valve 69 permits discharge of the contents of leg 51 to a sewer. The construction of the leg of the grainer, the function of introducing brine directly thereinto for laundering the salt crystal aggregates, and the subsequent removal of the slurry is fully disclosed in my above referred to patent and reference may be had thereto for a more specific description and function of this phase of operation of the apparatus.

Particular attention is directed to the provision of the by-pass conduit 19 for introducing under saturated brine to the well 9 and to the provision of the slots 63 in the vertical wall of the annular top portion or pan 24 of the grainer 25, serving to admit brine from which the salt aggregates have been removed to the well 9 which together with the brine from the storage tank 5 enables the continuous operation of the apparatus by preventing formation of salt crystals in the conduits and pump leading to the heat exchanger. It will be further observed that, since the nozzles of the discharge of the conduit 23 are directed circumferentially that, a rotary motion is imparted to the brine in the grainer without the use of paddles or other auxiliary or ancillary mechanical equipment. The provision of a steam ejector for operating the flasher and condenser under partial vacuum enables substantially continuous operation of the system with increased thermal efficiency.

While I have disclosed what I consider to be the preferred embodiment of my invention it will be understood that various rearrangements and modifications may be made therein without departing from the spirit and scope of the appended claims.

I claim:

1. The method of making salt in a grainer structure comprising a grainer and a communicating well, which method comprises continuously supplying hot supersaturated brine to said grainer, evaporatively cooling said brine and crystallizing salt therefrom in said grainer, continuously withdrawing saturated brine substantially free of crystals from said grainer into said well, supplying fresh brine to said grainer structure, withdrawing a stream of brine from said well, heating said stream in a heater, dividing the brine from said heater into two streams, returning one stream to said well, flash evaporating the other stream so as to produce a supersaturated brine, and returning said supersaturated stream to said grainer.

2. The method of making salt in a grainer which comprises continuously supplying a feed of hot supersaturated brine to said grainer, evaporatively cooling said brine and crystallizing salt therefrom in said grainer, continuously withdrawing saturated brine substantially free of crystals from said grainer into a communicating well, supplying fresh brine to said well, withdrawing a stream of brine from said well, heating said stream in a heater, dividing the brine from said heater into two streams, returning one stream to said well, flash evaporating the other stream so as to produce a supersaturated brine, and returning said supersaturated stream as said feed to said grainer.

3. The method of making salt in a grainer, the evaporative cooling portion of which is of circular form, comprising continuously supplying a feed of supersaturated brine through nozzles so directed that the brine is given a circular movement evaporatively cooling and crystallizing salt therefrom in said portion, withdrawing a crystal sludge by a centripetal vortex in a depending central portion of said grainer, continuously withdrawing saturated brine substantially free of crystals from said grainer into a communicating well, supplying fresh brine to said well, withdrawing a stream of brine from said well, heating said stream in a heater, dividing the brine from said heater into two streams, returning one stream to said well, flash evaporating the other stream so as to produce a supersaturated brine, and returning said supersaturated stream as said feed to said grainer.

4. A grainer having a shallow cylindrical top portion, a nozzle disposed to discharge brine into said cylindrical top portion substantially circumferentially thereof, an intermediate portion in part at least of substantially inverted frusto-conical form substantially concentric with and depending from said top portion, said intermediate portion being of materially less diameter than said top portion, and a well adjacent a portion of the periphery of said top portion remote from the discharge end of said nozzle, said portion of the periphery of said top portion having an opening therein providing a connection between said top portion and said well.

CLINTON S. ROBISON.

REFERENCES CITED

The following references are of record in the file of this patent:

UNITED STATES PATENTS

| Number | Name | Date |
|---|---|---|
| 2,279,061 | Robison | Apr. 7, 1942 |
| 1,976,836 | Harms | Oct. 16, 1934 |
| 1,091,721 | Weil | Mar. 31, 1914 |
| 2,042,661 | Jeremiassen | June 2, 1936 |
| 1,900,247 | Martin | Mar. 7, 1933 |
| 1,879,445 | Othmer | Sept. 27, 1932 |
| 1,873,329 | Ritchie | Aug. 23, 1932 |
| 2,066,577 | Ritchie | Jan. 5, 1937 |
| 1,348,409 | Grimwood | Aug. 3, 1920 |
| 2,067,043 | Caldwell | Jan. 5, 1937 |
| 1,006,823 | Block | Oct. 24, 1911 |
| 2,025,059 | Kermer | Dec. 24, 1935 |
| 2,000,038 | Schmalenbach | May 7, 1935 |